3,274,927
METHOD AND APPARATUS FOR DECORATING CONTAINERS

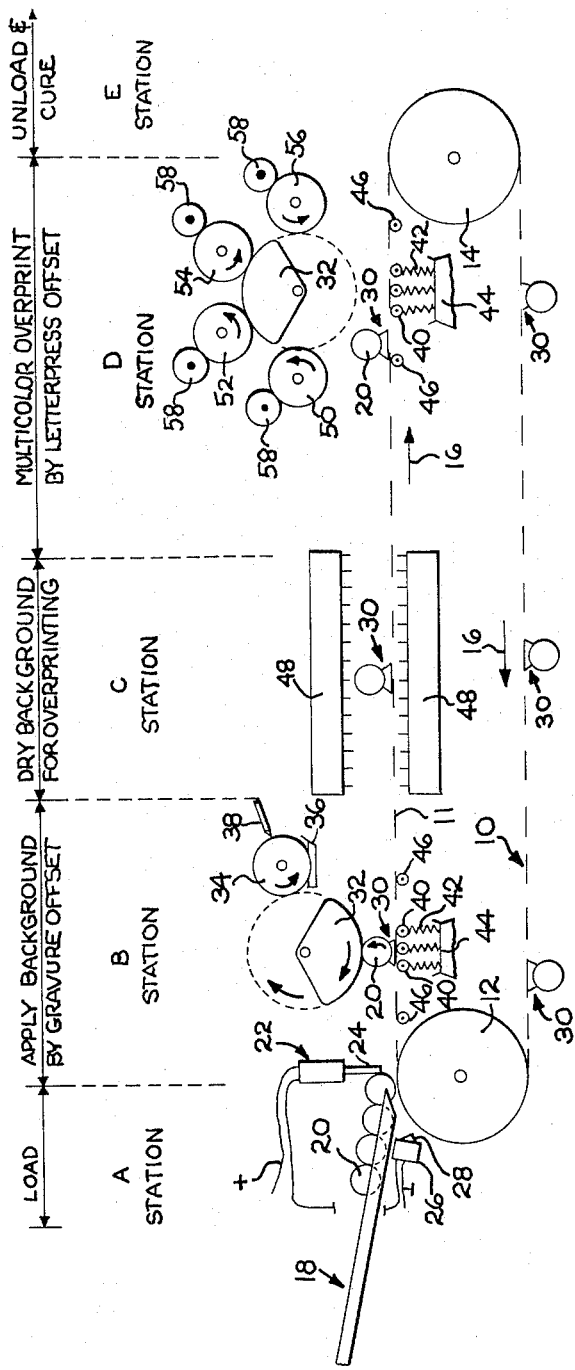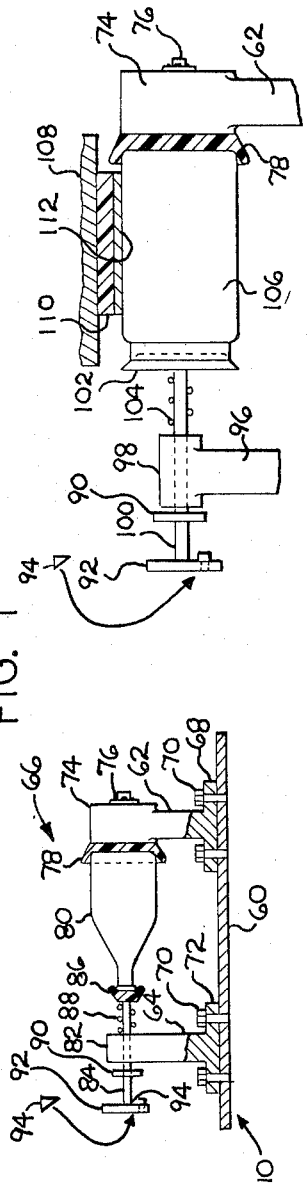
INVENTORS
KENNETH G. LUSHER
LOWELL J. WELLS
BY
ATTORNEYS

Kenneth G. Lusher, Perrysburg, and Lowell J. Wells, Toledo, Ohio, assignors to Owens-Illinois, Inc., a corporation of Ohio
Filed June 26, 1964, Ser. No. 378,290
5 Claims. (Cl. 101—40)

This invention relates to the decoration of containers and is particularly adapted to the high speed decoration of fragile containers such as glass bottles and the like, in a continuous manner and in a plurality of colors; still more particularly this invention relates to the decoration of containers by application of multicolored patterns over a background color, in a continuous manner, i.e. without intermediate handling between the beginning and end of the decorating operation.

The problem

In the prior art it has been one common practice to decorate containers such as bottles by transferring the containers to a stationary holding jig from a moving conveyor. While held in the jig, the container is rotated and a printed design applied thereto. After the printing operation is completed, the article is then released from the jig and transferred back to the conveyor, to be moved to another station for a repeat of the foregoing for application of a second color.

Necessarily the handling produces an intermittent and relatively slow flow of the container product along the produciton line.

The multiple handling also contributes to possible damage of the container as by abrasion. Where glass containers are being processed, this may mean breakage and resultant stoppage of the operation, but even more serious is the fact that abraded containers are delivered to the trade which are inherently, structurally weakened.

Accordingly, an important contribution to the art would be provided by a novel apparatus for decorating containers, such as glass containers, on a continuous basis, and without rehandling between beginning and end of the decorating cycle, as compared to the prior art intermittent apparatus; and further, a contribution would be provided by a method for decorating fragile containers on a continuous, high-speed basis and without intermediate handling, and thus without abrasion and possible damage to the articles.

Accordingly, it is an important object of the present inventon to provide a novel apparatus for printing overlapping, multicolored designs on containers in a continuous and high-speed manner.

A further object is to provide a novel apparatus for printing multicolored designs on glas containers wherein the containers are continuously moved and at the same time retained in a single holding jig, without being transferred therefrom.

A further object is to provide a novel method for decorating containers wherein overlapping colors are applied successively, but drying of the first color is effected before application of the second color; all at high speed and in a continuous manner, that is, while the containers are being continuously moved.

A further object is to provide a novel method for decorating glass containers wherein a backgruond color is first applied and dried; and followed by application of a multicolored overlay, all in a manner wherein the containers are continuously moved during the processing, and to produce images of a vivid nature, compared to the absence of a background color.

Other objects of the invention will appear in the following description and appended claims, reference being made to the accompanying drawings forming a part of this specification wherein like reference characters designate corresponding parts in the several views.

FIG. 1 is a schematic side elevational view showing the apparatus of the present invention, and illustrating the method that is capable of being carried out by that apparatus, among others;

FIGURE 2 is an elevational view, and partly in section, of a jig mechanism for use in FIGURE 1, to hold small mouth containers; and FIGURE 3 is an elevational view, and partly in section, of a jig mechanism for use in FIGURE 1, adapted to index and hold large mouth containers.

It is to be understood that the invention is not limited in its application to the details of construction and arrangement of parts illustrated in the drawings, since the invention is capable of other embodiments and of being practiced and carried out in various ways. Also, it is to be understood that the phraseology or terminology employed herein is for the purpose of description and not of limitation.

A general view of the invention

Briefly, in the present invention, a continuously moving, endless belt carries a plurality of container holding jigs in which containers are placed, one to each jig, and held for free rotation about the axis of the container. As the moving belt carries the thus held containers along a work path, each individual container is first engaged with a printing cylinder that applies a background color.

In the present invention, it is contemplated particularly that organic colors be used. Therefore, within the scope of the invention, the first color, i.e., the background color is applied and immediately thereafter dried. Then an overprint of multicolor complexity is immediately applied.

In this invention, provision is made for supporting each container only once during its entire processing, and retaining it in the same jig mechanism all the way through the printing operation, so that there is no intermediate handling as in the prior art.

As will also become evident, the novel apparatus utilizes a continuous belt. In accordance with the invention, provision is made for flexing the continuous belt at each of the printing stations. Thus, floating contact is provided between each container or article being printed, and each printing roll used in the system. This provides a unique and improved printing contact with improved image transfer.

As will become evident, the conveyor apparatus is so constructed and arranged that smooth, fast, and continuous flow of the workpieces through the system is provided with the printing and drying actually being effected "on the fly."

In view of the foregoing, both novel apparatus and method have been provided by the invention, for continuously applying multicolored patterns, wherein the workpiece is loaded into a holding jig once at the beginning of the operation and is not subsequently unloaded until the completed decoration has been applied in its entirety.

The general details of the invention

By referring to FIGURE 1, it will be noted that a continuous foraminous belt 10 is lapped over two spaced rollers 12 and 14. The rollers 12 and 14, of course, have their axes aligned in parallelism and are appropriately mounted and journalled for rotation. One of the rollers 12, 14 is power driven by a source not shown, to move the belt 10 in the arrow direction 16.

Arrangement of the various mechanisms associated with the belt 10 include the following, reading from left to right in FIGURE 1:

A station: means for loading the containers.
B station: printing apparatus for applying background color.
C station: apparatus for drying the background color to avoid intermingling with subsequent colors applied over the background color.
D station: apparatus for applying a multicolor design overprint on the dried background color.
E station: mechanism for unloading and curing the overprint colors; or optionally curing the second color as is done at the C station, and then unloading.

The A station—Loading the containers

This station suitably includes an inclined conveyor 18. The inclination of the conveyor 18 is of an angle such that the containers 20 will be automatically fed to the machine by gravity.

A solenoid feeder 22 is used to meter the containers 20 one at a time onto holding jigs 30 transported by the continuously moving belt 10. The solenoid feeder 22 includes a plunger 24 that engages the forward container 20 to hold the remaining containers back until the next container is called for by the machine.

A microswitch 26 is mounted in adjacent relationship to the belt 10. The actuator button 28 thereof is exposed toward the belt 10. A plurality of holding jigs indicated generally by the reference numerals 30 are carried at spaced points along the belt 10. The button 28 of the microswitch 26 is positioned to be engaged successively by each jig 30 as it is carried past the switch point by movement of the belt 10.

As each jig 30 passes the switch 26, an abutment thereof engages the strike button 28 and thus the solenoid is actuated. This actuation is effective to lift the solenoid rod 24 upwardly and thereby release a container 20 to drop into the jig 30 at the instant it passes in appropriate container receiving relationship beneath the right hand feed end of the inclined conveyor 18. The solenoid is spring loaded so that the rod 24 is normally extended as indicated. Thus, when the contact is broken by a jig 30 passing beyond the actuator button 28, the solenoid rod is automatically returned to the holding position for retaining the stack of containers 20 in reserve for the next jig loading operation.

The B station—Mechanism for applying the background color

At this station, a blanket cylinder 32 is mounted in rotatable relationship above the top flight 11 of conveyor belt 10. Suitable drive means, not shown, is provided for rotating this cylinder 32.

A gravure cylinder 34 is journalled to rotate in peripheral contact with the blanket cylinder 32 and transfer an image to the blanket cylinder. The gravure cylinder 34 carries a suitable image developed in accordance with existent knowledge of the art. Ink is suitably applied to the gravure cylinder 34 by having the lower peripheral portion of this cylinder continuously dip into a body of ink carried within a container 36. A doctor blade 38 removes ink from the non-image areas of the gravure cylinder 34 so that an appropriately clear image is impressed upon the blanket cylinder 32.

As the blanket cylinder 32 is rotated, the gravure cylinder 34 is also rotated at a speed synchronized with the peripheral speed of the blanket cylinder for image or ink transfer.

As the supported container 20 is moved along in the arrow direction 16 by the conveyor belt 10, it is brought into frictional, peripheral contact with the blanket cylinder 32. This frictional contact is effective to rotate the container which is held by the holding jig 30. Thus, the image is smoothly transferred.

The container biasing means

As is well known, in order for an image to be accurately imparted to an uneven surface such as that of a container, particularly a glass bottle or jar, and more particularly when such an uneven surface is rotated at high speed, it is necessary that the container and printing roller be resiliently biased into intimate contacting relationship with one another all over the area to which the image is to be applied.

In the present invention this is effected in a novel manner by permitting the conveyor belt 10 to deflect in the space directly beneath the blanket cylinder 32. This permits or causes the container to follow the path of an arc as it passes, without stopping, beneath the blanket cylinder 32.

This permits the conveyor 10 to move continuously.

The suspension mechanism for the conveyor belt 10 at the printing B station therefore comprises spring-loaded idler rollers 40. Springs 42 are mounted on a frame member 44. The springs 42 thus bias the idler rollers 40 upwardly to support the upper flight 11 of the belt 10.

As a jig 30 passes over the spring-loaded idler rollers 40, the springs 42 deflect and exert pressure on the container 20, and thereby resiliently force the container into intimate printing engagement with the blanket cylinder 32 as the printing action takes place.

It is to noted that on either side of the spring-loaded idler rollers 40, there are placed fixed idler rollers 46. These prevent vibration waves from being transmitted the length of the belt and thus stabilize the belt, and keep the other holding jigs 30, placed thereon, from being disturbed in their travel through the system.

Advantages

It should be noted that several advantages arise from the present invention, and these are briefly enumerated at this point, because they are so apparent here.

First: The conveyor belt 10 is moving continuously during the processing and during its functioning in accordance with the present invention. Thus, the apparatus of the present invention is capable of processing units at a high rate and in a simplified manner.

Secondly: By rotating the blanket cylinder 32 in a direction contra to the direction of travel of the conveyor belt 10, contact time between the containers 20 and the blanket printing cylinder 32 is reduced. Thus, more containers can be printed in a given time interval than if the blanket cylinder 32 and conveyor 10 were moved in the same direction.

The C station—Drying the background color

At this station, suitable infrared sources or burners 48 are utilized for drying the background color applied at the immediately preceding station B.

The infrared sources can be of the high-intensity gas burner type. This provides high speed drying in a short run of conveyor length, and thus the length of the production line can be shortened and the equipment made more compact. If desired, however, lesser intensity driers can be used over an appropriately longer drying zone. In any event, the degree of intensity will be correlated to the interval represented by the time allowed for each container to pass through the drying zone at a desired production speed.

It should be pointed out at this time, of course, that the belt 10 and the jigs are made of suitable grades of steel to withstand the heats developed by the infrared sources 48. It would be logical of course to use stainless steel woven wire mesh belts for the unit 10. The jigs will suitably be made of machined steel and these will withstand the temperatures developed for setting the organic inks at the station C.

*The D station—Multicolor design overprint on the dried background color*

At this station, a blanket cylinder 32 is also used, to provide printing in a manner analogous to station B. However, a plurality of die cylinders, commensurate in number with the complexity of the design applied, that is the number of colors, is used therein.

Thus, at this station, four die cylinders 50, 52, 54 and 56 are used. Each of the four die cylinders is provided with its own inking roller 58.

As the previously dried article 20 advances through station D, it will engage the rotating blanket cylinder 32 and thereby be rotated to receive a non-overlapping multicolor impression from the blanket cylinder. The belt is suitably spring supported by spring-loaded idler rollers 40, with springs 42 being employed. The fixed idler rollers 46, adjacent each side of the spring-loaded idler rollers 40, are the same as at station B. Thus, the belt 10 can deflect and the springs 42 resiliently bias the article 20 upwardly into intimate peripheral printing contact with the rotating blanket cylinder 32.

*Elimination of double deflection problems*

Since deflection of conveyor belt 10 is necessary at each of the printing stations B and D, the blanket cylinder on one press is set 180° out of phase with the blanket cylinder of the other press. This is shown in FIGURE 1. This eliminates double deflection problems. Thus, only one deflection at a time is imparted to the belt 10. The length of the belt will permit this deflection to take place. If a double deflection were encountered, the problem would arise. However, by the arrangement shown, the problem is avoided.

*The E station—Unload and cure*

A degree of flexibility is to be understood as existing at this station of the present invention. Thus, the printed articles can be unloaded and transferred to a slow speed conveyor that moves them through an oven at a lower speed, to cure the ink applied at the station D. Of course, such low speed conveyor would be much wider than the single unit conveyor belt utilized in this high speed printing operation. In any event, such subsequent conveyor would be of a width to receive and convey the printed articles produced.

Alternately, a second high-intensity cure section, such as station C, could be placed over the conveyor belt 10, the belt of course being extended in length to accommodate such additional high-speed cure section.

Thus, either low or high speed final cure is to be considered within the extended scope of the present invention.

*A typical jig*

Two logical jigs for use in the present invention are illustrated in FIGURES 2 and 3.

*The jig of FIGURE 2: For small mouth containers*

This jig is adapted to support small mouth containers such as bottles and the like. At the bottom of FIGURE 2, of course, is the belt 10, as shown and described relative to FIGURE 1. The belt 10 will be understood to have transversely extending plate members 60, forming appropriate support for the pedestal bases 62 and 64 of the jig mechanism 66. The right hand pedestal base 62 is formed with a bottom plate 68 and bolts 70 pass through it and down into the belt plate 60. Similarly, the other pedestal member 64 is provided with a plate-like base 72, and bolts 70 are similarly applied.

The right hand pedestal member 62 at its upper end, carries a bushing member 74. This receives the shaft 76 of the bottle bottom chuck member 78. Thus, the bottle bottom chuck member 78 is mounted for free rotation in the bearings of the bushing member 74. Suitably, ball bearings are used in the bushing member 74.

The bottle bottom chuck member 78 is a cup-shaped member and has a side wall of frusto-conical configuration. The right hand end is closed but the left hand end is open to receive and automatically center the bottom of the bottle 80.

The left hand pedestal member 64 also includes a bushing 82, at its top end, to rotatably and slidably receive the shaft 84 of the bottle neck end chuck member 86. The chuck member 86 is also of frusto-conical configuration for automatically centering the small mouth end of the bottle 80.

A spring 88 is placed around the shaft 84 to normally bias the bottle mouth chuck member 86 into engaging relationship with the neck end of the bottle 80.

The shaft 84 extends in exposed relationship beyond the left hand end or side of the bushing 82 and carries a first abutment member 90. This limits the distance the spring 88 can move the chuck member 86 to the right when no bottle is in the jig.

At its extreme left hand end, the shaft 84 has a second abutment member 92 thereon. The purpose of this abutment member 92 is to engage a triangular shaped actuator member 94, fixedly mounted to the frame of the machine or in space, in a suitable member. As the jig mechanism 66 is moved past the actuator member 94, the left hand chuck member 86 is moved to the left, by engagement of the abutment 92, so that the left hand chuck member 86 clears the neck of the bottle and permits the jig to embrace the bottle. Then, when the abutment member 92 passes on beyond the triangular actuator 94, the left hand chuck member will move close against the mouth of the bottle 80. Thus, the bottle 80 is properly positioned for the subsequent printing operations.

*The jig of FIGURE 3—For large mouth containers*

This jig is adapted to support large mouth jars and the like.

The right hand end is similar to that of the jig mechanism 66 of FIGURE 2. Thus, there is a pedestal 62, having a bushing 74 at its upper end. The chuck member 78 has its shaft 76 rotatably journalled in the bushing 74.

At the left hand side of FIGURE 3, a pedestal member 96 has a bushing 98 at its upper end. The shaft 100 of the left hand chuck member 102 or container mouth end chuck member is rotatably and slidably journalled in the bushing 98.

A spring 104 is positioned around the shaft 100 between the bushing 98 and the chuck member or head 102 to normally bias the chuck member toward the right hand chuck member 78 or the tail stock of the jig.

A distinction is apparent between the head stock chuck member 102 of this jig embodiment and that of the jig of FIGURE 2. Thus, the head stock 102 is enlarged in diameter and has an external frusto-conical configuration as compared to the internal frusto-conical configuration of the chuck member 86 of FIGURE 2. This head stock 102 fits into the neck of the large mouth container 106 and thus automatically centers the container when the spring 104 biases the member 102 to the right in FIGURE 3.

An abutment 90, as in FIGURE 2, limits the right hand travel of the shaft 100; and a left hand abutment 92 cooperates with a triangular shaped actuator member 94 as in FIGURE 2.

The printing roller is indicated at 108 and the rubber backing blanket is designated 110. The printing image layer 112 is carried on the surface of the blanket 110 and is shown in printing contact with the periphery of the large mouth container 106.

The method of invention

From the foregoing, it is evident that a novel method is inherent in the present invention. The steps of the invention are generally shown in FIGURE 1 of the drawings. The steps are summarized as follows:

*Step 1.*—This step comprises the loading of a container into a jig. Then the container is continuously moved in linear manner through the subsequent steps or stages of the process. This movement is transverse to the axis.

*Step 2.*—While the container is moving in a first lineal direction, the background print or color is applied to the container. In this stage of printing, as in all stages of printing in the present invention, the printing medium is moving in a direction contra to the direction of travel of the container through the process. Therefore, it can be stated that the printing medium is traveling in a second direction.

*Step 3.*—The container is then subjected to suitable energy and the first-applied color is dried. In short, the container and its first applied color are exposed to drying radiation during a short interval of time while the container continuously moves through the process.

*Step 4.*—The dried container then has an overprint applied upon the previously dried, first applied color.

*Step 5.*—The total applied coloring is then cured. This can be effected by unloading the container from the jig and curing the coloring in an oven. Alternately, the label can be subjected to high-intensity radiation for cure before unloading from the holding jig.

From the foregoing, it will be understood that there is no intermediate handling during the entire process.

Logical extension of the invention

Several runs have actually been made utilizing the principles of this invention. By so operating, sharp, opaque prints have been consistently produced at a high rate of speed.

This invention is particularly adapted to the application of organic ink formulations. These must withstand the normal processing in the user's plant without failure. Application by the method of the present invention, using appropriate colors, has resulted in the production of printing bearing satisfactory physical and chemical durability. However, it is to be understood that the principles of the invention are applicable to the use of fusible ink materials including frits and the like.

The above description has described die cylinders for use at station D. In the art, this generally means a dry offset process. However, the extended scope of invention would include a wet offset or lithographic process at station D. Thus any transfer means can be used for applying an image to the blanket cylinder. Also, known electrostatic means can be employed to assist the transfer from the blanket cylinder to the article. For these reasons, the broad terminology "printing medium" has been used in the claims.

What is claimed is:

1. In a method of decorating an article with a background color having an overprint thereon,
   the steps of,
   loading the article into a jig and then moving the article along a linear path,
   applying a first color to the article by moving a printing medium into printing relation with the article, said printing medium being carried on a member rotating in a manner tending to oppose the linear movement of the article,
   exposing the article to radiation to dry said first color,
   and without removing the article from the jig after the first printing, applying an overprint on the dried first color by an operation wherein the printing medium is carried on a member rotating in a manner tending to oppose the linear movement of the article.

2. In a method of decorating the exterior surface of a body, having an axis of rotation,
   the steps of,
   supporting the body in space for free rotation about the axis,
   moving the body in a linear path transverse to the axis,
   applying a first color to the body by moving a printing medium into printing relation with the periphery of the body, said printing medium being carried on a member rotating in a manner tending to oppose movement of the body through space,
   drying said first color while continuing to move the body along said linear path,
   and without changing the support of the body in space and while continuing its linear movement, applying a second color to at least a portion of the previously printed surface of the body by moving a printing medium into printing relationship with the periphery of the body, said printing medium being carried on a member rotating in a manner tending to oppose linear movement of the body.

3. In a method of decorating an axially concentric article,
   the steps of,
   supporting the article in space for rotation about the axis,
   moving the article in a path transverse to the axis,
   in a single step, applying a first color to the article by moving a printing medium into printing relationship with the periphery of the article, said printing medium being carried on a member rotating in a manner tending to oppose the linear movement of the article, and moving the article through an arcuate path during said printing relationship,
   drying said color while continuing to move the article along said path,
   and then while continuing movement of the article, applying a second color.

4. In a method of decorating a container having an axis,
   the steps of,
   supporting the container in space for rotation about said axis,
   continuously moving the container in a linear path transverse to said axis,
   while continuously moving the container, applying a first color to the container by moving a printing medium into printing relation with the container, said printing medium being carried on a member rotating in a manner tending to oppose the linear movement of the container,
   drying said first color while continuing to move the container along said linear path,
   without changing the support of the container in space and while continuing the movement, applying a second color to the container,
   and then drying the second color.

5. In a method of decorating an article having a convex surface,
   the steps of,
   supporting the article in space for free rotation about its axis,
   moving the article in a linear path transverse to its axis,
   and while continuing said movement, applying a color to the convex surface of the article by moving a printing medium into peripheral printing relation with the article, said printing medium being carried on a member rotating in a manner tending to oppose the linear movement of the article.

(References on following page)

References Cited by the Examiner

UNITED STATES PATENTS

| | | | |
|---|---|---|---|
| 630,149 | 8/1899 | Wellington | 101—38 |
| 2,157,638 | 5/1939 | Soubier | 101—115 |
| 2,866,403 | 12/1958 | Zimmermann et al. | 101—115 |
| 3,099,544 | 7/1963 | Sheesley | 101—426 |
| 3,112,692 | 12/1963 | Cookson | 101—38 |
| 3,164,089 | 1/1965 | Browning | 101—426 |

ROBERT E. PULFREY, *Primary Examiner.*

NATHANIEL HUMPHRIES, WILLIAM McCARTHY, *Assistant Examiners.*